United States Patent [19]

Slack

[11] Patent Number: 5,426,646

[45] Date of Patent: Jun. 20, 1995

[54] INSTANTANEOUS BIT-ERROR-RATE METER

[75] Inventor: Robert A. Slack, San Diego, Calif.

[73] Assignee: The United States of America as represented by the Secretary of the Navy, Washington, D.C.

[21] Appl. No.: 904,111

[22] Filed: Jun. 25, 1992

[51] Int. Cl.[6] .......................... G06F 11/00; H04B 3/46
[52] U.S. Cl. ..................................................... 371/5.1
[58] Field of Search ........................ 371/5.1, 5.2, 5.3; 375/10

[56] References Cited

U.S. PATENT DOCUMENTS

| | | | |
|---|---|---|---|
| 3,824,548 | 7/1974 | Sullivan et al. | 371/5.3 |
| 4,091,240 | 5/1978 | Lainey et al. | |
| 4,097,697 | 6/1978 | Harman | 179/175.3 R |
| 4,234,954 | 11/1980 | Lange et al. | |
| 4,367,550 | 1/1983 | Douverne | 371/5.1 |
| 4,475,210 | 10/1984 | Couch | 375/10 |
| 4,627,071 | 12/1986 | Head et al. | |
| 4,809,298 | 2/1989 | Sakane et al. | 375/17 |
| 5,034,939 | 7/1991 | Kurz et al. | |

Primary Examiner—Charles E. Atkinson
Attorney, Agent, or Firm—Harvey Fendelman; Peter A. Lipovsky; Eric James Whitesell

[57] ABSTRACT

An instantaneous bit-error-rate meter provides an instantaneous, real-time reading of bit-error-rate for digital communications data. Bit-error pulses are input into the meter and are first filtered in a buffer stage to provide input impedance matching and desensitization to pulse variations in amplitude, rise-time and pulse-width. The bit-error pulses are transformed into trigger signals for a timing pulse generator. The timing pulse generator generates timing pulses for each transformed bit-error pulse, and is calibrated to generate timing pulses having a preselected pulse width corresponding to the baud rate of the communications data. An integrator generates a voltage from the timing pulses that is representative of the bit-error-rate as a function of the data transmission rate. The integrated voltage is then displayed on a meter to indicate the bit-error-rate.

7 Claims, 1 Drawing Sheet 5,426,646

INSTANTANEOUS BIT-ERROR-RATE METER

STATEMENT OF GOVERNMENT INTEREST

The invention described herein may be manufactured and used by or for the Government of the United States of America for governmental purposes without the payment of any royalties thereon or therefor.

DOCUMENTS INCORPORATED BY REFERENCE

U.S. Pat. No. 3,824,548 titled "Satellite Communications Link Monitor" issued to Dean R. Sullivan and James E. Pohl is hereby incorporated by reference with all its appertaining documents and references.

BACKGROUND OF THE INVENTION

2. Field of the Invention

This invention pertains broadly to the field of digital communications. More particularly, the invention relates to an apparatus that discloses the error percentage or rate that a received digital data stream differs from its transmitted digital data stream.

2. Description of the Related Art

In the past, bit-error-rate (BER) measuring instruments or methods have been based on taking a large sample of a digital transmission over an extended period of time. During this time, transmitted bits were compared with received bits. Error pulses were counted for each received bit lacking correspondence with its transmitted bit. The number of errors was then divided by the total number of bits transmitted to give a BER measurement (i.e. the percentage of bits in error). This process took several minutes to tens of minutes or even longer just to obtain a single BER reading. Besides taking a long time, the measurements obtained were only the averaged values over the measurement period. Because of this averaging, moment-to-moment variations of BER or what is known in the art as the "burstiness" of the errors were not indicated.

There is a need in the digital communication field for a device that displays real-time BER instantaneously permitting one to observe how BER is changing with time.

SUMMARY OF THE INVENTION

The instantaneous bit-error-rate meter (IBERM) of the invention is designed to provide an instantaneous, real-time reading of bit-error-rate for digital communications systems. Bit error pulses, derived through an apparatus and/or a method independent of the invention to be described herein, are input into the instantaneous bit error rate meter. The error pulses are first filtered in a buffer stage to provide input impedance matching and desensitization to pulse variations in amplitude, rise-time and pulse width. The bit-error pulses are thereby transformed into signals of predictable characteristics. These transformed error pulses are then used as trigger signals to be applied to a timing pulse generator.

The timing pulse generator generates a timing pulse for each transformed bit-error pulse, and is calibrated to generate timing pulses having a preselected width that corresponds to the baud rate of the communications system being monitored.

An integrator is then used to generate voltage from the timing pulses when they are present. The voltage corresponds to the bit-error-rate of the communications system being observed and is sent to a meter driver section that conditions the voltage for meter display.

OBJECTS OF THE INVENTION

It is an object of the invention to provide an improved way of indicating bit-error-rate for digital communications systems.

Another object of the invention is to provide an improved bit-error-rate meter that permits real-time reading of bit-error-rate.

Yet a further object of the invention is to provide an improved bit-error-rate meter that permits instantaneous bit-error-rate readings that are limited in time only by circuit propagation and meter response delays.

DESCRIPTION OF THE PREFERRED EMBODIMENT

Figure 1:
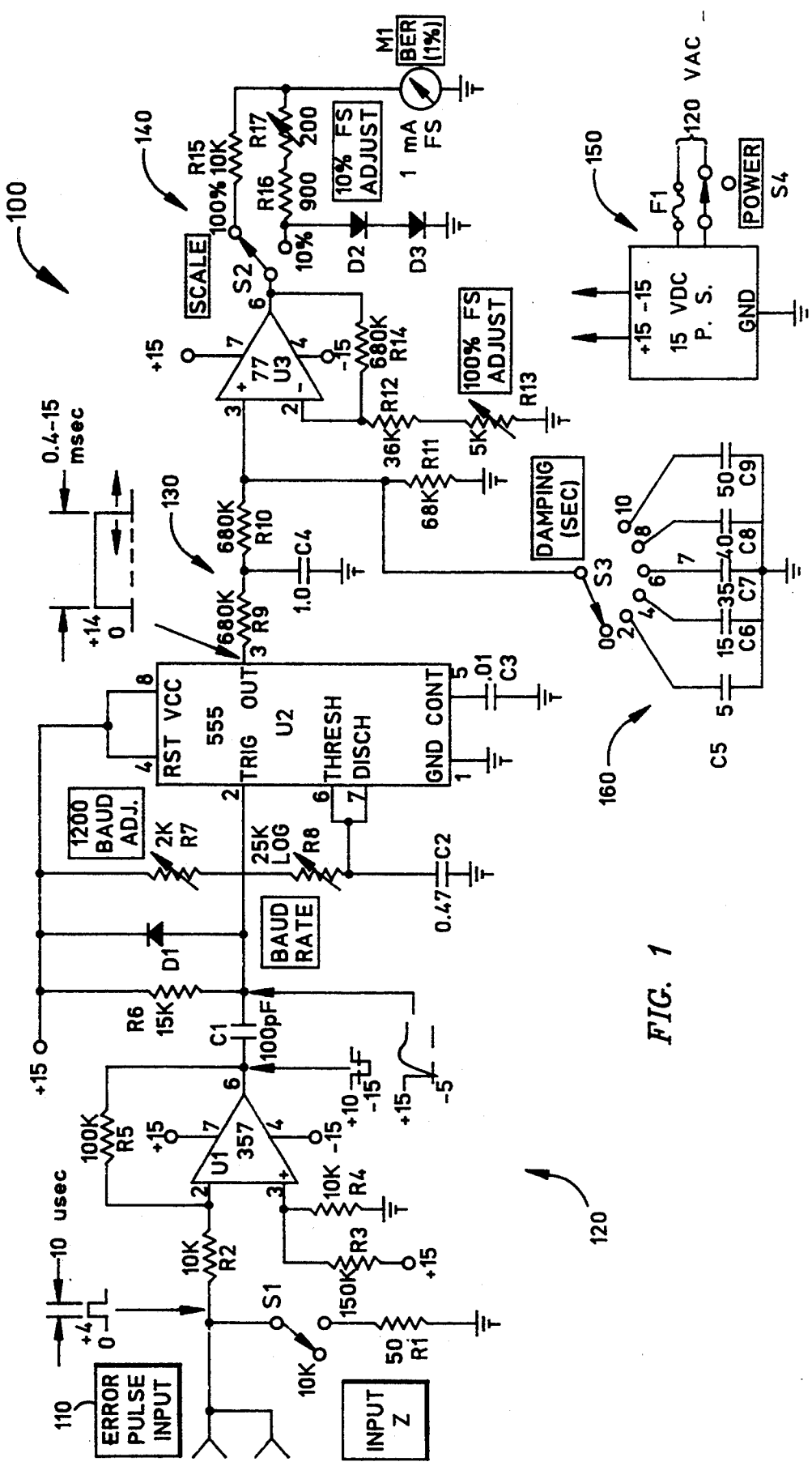
FIG. 1 is a schematic of a representative implementation of the invention.

Referring to FIG. 1, an instantaneous bit-error-rate meter (IBERM) 100 is shown. Input to the IBERM are error pulses 110 indicative of the discrepancy between a transmitted digital data stream and this stream as received by a communication system being monitored. Error pulses such as these are derived through the invention described in U.S. Pat. No. 3,824,548 incorporated by reference herein, and in particular the output of element 50, the bit comparison circuit of this invention. These error pulses indicate that received bits are not identical to transmitted bits.

Switch S1 of the invention provides the user with a choice of input impedances. In the representative embodiment of the invention shown, a 10 k ohm impedance is made available for typical transistor-transistor logic (TTL) inputs whereas a 50 ohm resistor R1 is provided for cases where error pulses are received over a typical 50 ohm coaxial line.

Operational high gain amplifier U1, such as an LS357, is part of a buffer stage 120 that provides input impedance matching and desensitization to variations in error pulse amplitude, rise-time and pulse width. Resistors R3 and R4 provide a threshold input level of about one volt in this implementation to suppress input noise and offset voltages. Resistors R2 and R5 gives U1 a gain of about ten. With no input, the one-volt offset at pin 3 of amplifier U1 is amplified to give a +10 volts output at pin 6. When the input to amplifier U1 exceeds 2.5 volts, the amplifier saturates, amplifying the 1.5 volt differential input to the −15 VDC power supply level.

The output of amplifier U1 is differentiated to provide a trigger signal of narrow signal characteristics. This output is differentiated by capacitor C1 and resistor R6, and the positive going transition is clipped to +15 volts by diode D1 that serves as a circuit protector. Thus, for IBERM 100 input pulses of greater than +2.5 volts with pulse widths of greater than 5 μsecs or so, a sharp, negative going trigger will be applied to input pin 2 of timing pulse generator circuit U2. Circuit U2 (such as an NE555) outputs a positive 0 to +14 volt timing pulse for each input trigger pulse. The width of this outputted timing pulse is determined by the time constant of the R7, RS, C2 network and is set to correspond to the baud rate of the digital communications system being monitored as will be further explained. Initially, C2 will be discharged. A trigger pulse at pin 2 of U2 opens up the discharge path, allowing C2 to charge towards +15 volts at a rate determined by R7 and R8. When C2 charges to +10 volts at pin 6 and 7 of U2, U2 resets, ending the output timing pulse at pin 3. Capacitor C3 is for noise filtering.

The timing pulses outputted from U2 are sent to an integrator 130 including R9, R10 and C4. The resulting DC voltage of the integrated output pulses is attenuated by R11 to provide a reasonably small input impedance to amplifier U3. U3 serves as part of a meter drive circuit 140 as will be further explained. Capacitors C5 through C9 provide optional damping of the U3 input voltage as may be selected by switch S3. Resistors R12, R13 and R14 set the gain of operational amplifier U3. Amplifier U3 (which may be, for example, an OP77) provides the gain and drive capability to control meter M1.

Switch S2 selects the meter scale so that a user may read either a 10% or 100% bit-error-rate at the full scale of the meter. In the 100% position, R15 produces a full-scale reading on the meter, providing 1 ma of current for a 10 VDC output from U3, pin 6. In the 10% position of S2, R16 and R17 provide a 1 ma current to produce a full-scale reading on M1 with an output from U3 of 1 VDC. Diodes D2 and D3 provide meter protection on the 10% scale by limiting the voltage at the R16 input to about 1.5 VDC, thereby limiting meter current to about 1.5 ma maximum. A ±15 VDC power supply (P.S.) 150, along with fuse F1 and power switch S4, provide power to IBERM 100.

Operation of the invention is as follows: for a digital communications system operating at 50 baud, for example, the invention is calibrated by injecting simulated error pulses at 50 pulses per second (PPS). The 50 PPS represent a 100% BER at 50 baud. The invention is adjusted at this time to read a 100% BER on meter M1. This adjustment is done by setting the Baud Rate pot, R8, for its maximum resistance (25K) and adjusting resistor R13 for a full-scale meter reading with switch S2 in the 100% position. Under these conditions, timing pulse generator U2 generates timing pulses about 15 msec long every 20 msec. These pulses are then integrated by integration network 130 including the combination of R9, R10, and C4.

For lower bit-error-rates, timing pulse generator U2 will produce proportionately fewer pulses per second and a correspondingly lower voltage will be produced by the integration network of R9, R10 and C4, thereby giving a lower BER measurement on meter M1. For higher baud rate, error pulses will occur more often for a given bit-error-rate.

For example, at 100 baud, error pulses will occur at a 100 PPS rate when the BER is at 100%. For these higher baud rates, the Baud Rate pot R8 is set so that the output timing pulse width of U2 is correspondingly less, so that the bit-error-rate meter M1 reads properly. For the 100 baud example, R8 would be set to a preselected 100 baud position which will give a U2 timing pulse width of 7.5 msec, one-half of that for the 50 baud rate. The timing pulse output of U2 will then be 7.5 msec pulses every 10 msec (for a 100% BER) instead of the 15 msec every 20 msec for the 50 baud case. The same duty cycle (i.e. 0.75) is thus produced, giving an equal charging time to integrator components 130, and producing an equal 100% reading on meter M1.

In a preferred embodiment of the invention IBERM circuit 100 is designed to operate with baud rates from 50 to 1200 baud. For the maximum baud rate setting, potentiometer R7 is used and Baud Rate pot R8 is set to minimum resistance. The invention is designed to read BER levels from 1 to 100% and provides bit-error-rate scales of 10 and 100%. For low error rates at low baud rates (e.g. 1% BER at 50 baud), errors will occur very seldom (e.g. once every 2 seconds). Under these conditions, the damping capacitors 160 are required to produce accurate, constant readings.

It should be noted that the circuit values described herein can be changed to operate at much higher baud rates and to measure much lower BER values. Though the design described is essentially all analog, one skilled in the art will realize that increased precision should be realized if more complex digital circuitry were used. Such circuitry would also permit a design such that the sampling time of bit-error-rate measurements could be precisely varied. These design changes could, of course, permit operation of the invention over a wide range of bit rates and at much lower bit-error-rate levels.

Obviously, many modifications and variations of the invention are possible in light of the above description. It is therefore to be understood that within the scope of the appended claims the invention may be practiced otherwise than as specifically described.

What is claimed is:

1. An apparatus for indicating bit errors in digital communications data, said digital communications data having a data transmission rate, said bit errors being input to said apparatus as error pulses, said apparatus indicating said bit errors as a function of said data transmission, rate, said apparatus comprising:
   means for receiving said error pulses;
   means for generating timing pulses, a timing pulse being generated for each of said error pulses;
   means for setting a pulse width of said timing pulses according to said data transmission rate, such that said timing pulses become pulses width set timing pulses;
   means for generating voltage as a function of said pulse width set timing pulse; and
   means for displaying said voltage to represent bit error rate.

2. An apparatus according to claim 1 further including means for injecting said error pulses into said apparatus at a rate substantially equivalent to said data transmission rate and means for adjusting said means for displaying said voltage to indicate a 100 percent bit error rate.

3. An apparatus according to claim 1 in which said means for generating voltage includes an integrator.

4. An apparatus according to claim 3 in which said integrator has a time constant that is greater than said pulse width of said pulse width set timing pulses.

5. An apparatus for indicating bit errors in digital communications data, said digital communications data having a data transmission rate, said bit errors being input to said apparatus as error pulses, said apparatus indicating said bit errors as a function of said data transmission rate, said apparatus comprising:
   means for receiving said error pulses;
   means for filtering said error pulses so that said error pulses are transformed into trigger pulses;
   means for generating timing pulses, one of said timing pulses being generated upon receipt of one of said trigger pulses;
   means for setting a pulse width of said timing pulses according to said data transmission rate, such that said timing pulses become pulse width set timing pulses;

means for generating voltage proportionate to an integral of said pulse width set timing pulses;

means for amplifying said voltage to generate an amplified voltage; and means for displaying said amplified voltage to represent said bit-error-rate.

6. An apparatus according to claim 5 further including means for injecting said error pulses into said apparatus at a rate substantially equivalent to said data transmission rate and means for adjusting said means for displaying said amplified voltage to indicate a 100 percent bit error rate.

7. An apparatus according to claim 6 in which said integral has a time constant that is greater than said pulse width of said pulse width set timing pulses.

* * * * *